United States Patent
Lochbihler (10) Patent No.: US 10,682,878 B2
(45) Date of Patent: Jun. 16, 2020

(54) SECURITY ELEMENT FOR PRODUCING VALUE DOCUMENTS

(71) Applicant: GIESECKE & DEVRIENT GMBH, München (DE)

(72) Inventor: Hans Lochbihler, München (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 15/329,496

(22) PCT Filed: Jul. 14, 2015

(86) PCT No.: PCT/EP2015/001442
§ 371 (c)(1),
(2) Date: Jan. 26, 2017

(87) PCT Pub. No.: WO2016/015828
PCT Pub. Date: Feb. 4, 2016

(65) Prior Publication Data
US 2017/0217242 A1    Aug. 3, 2017

(30) Foreign Application Priority Data

Jul. 31, 2014  (DE) .................. 10 2014 011 425

(51) Int. Cl.
*B42D 25/328*    (2014.01)
*G02B 5/18*    (2006.01)
(Continued)

(52) U.S. Cl.
CPC .......... *B42D 25/328* (2014.10); *B42D 25/29* (2014.10); *B42D 25/351* (2014.10);
(Continued)

(58) Field of Classification Search
CPC .... B42D 25/328; B42D 25/29; B42D 25/351; B42D 25/373; B42D 25/425; G02B 5/1842; G02B 5/1861
(Continued)

(56) References Cited

U.S. PATENT DOCUMENTS 7,129,028 B2   10/2006   Koeda et al.
7,145,723 B2   12/2006   Tompkin et al.
(Continued)

FOREIGN PATENT DOCUMENTS

DE   102004042136 A1   3/2006
DE   102006050047 A1   4/2008
(Continued)

OTHER PUBLICATIONS

International Search Report for corresponding International PCT Application No. PCT/EP2015/001442, dated Dec. 21, 2015.

*Primary Examiner* — Justin V Lewis
(74) *Attorney, Agent, or Firm* — Workman Nydegger (57) ABSTRACT

A security element for manufacturing value documents provides at least one image, formed by a grating structure which has a plurality of trough-shaped microcavities. The microcavities have a structure width from 0.5 μm to 3 μm and an aspect ratio of 0.4 or greater, a metal-containing coating is applied to the grating structure, and in the grating structure the trough-shaped microcavities are separated from each other respectively by strips which are planar and respectively more than 200 nm and maximally 1,200 nm wide.

20 Claims, 10 Drawing Sheets

(51) Int. Cl.
*B42D 25/29* (2014.01)
*B42D 25/373* (2014.01)
*B42D 25/351* (2014.01)
*B42D 25/425* (2014.01)

(52) U.S. Cl.
CPC ......... *B42D 25/373* (2014.10); *B42D 25/425* (2014.10); *G02B 5/1842* (2013.01); *G02B 5/1861* (2013.01); *G02B 5/1866* (2013.01)

(58) Field of Classification Search
USPC ....... 283/67, 70, 72, 74, 82, 83, 94, 98, 901
See application file for complete search history.

(56) References Cited

U.S. PATENT DOCUMENTS

| | | | |
|---|---|---|---|
| 7,468,842 | B2 | 12/2008 | Steenblik et al. |
| 7,907,339 | B2 | 3/2011 | Tompkin et al. |
| 8,094,376 | B2 | 1/2012 | Schilling et al. |
| 8,238,027 | B2 | 8/2012 | Tompkin et al. |
| 8,534,708 | B2 | 9/2013 | Heim et al. |
| 9,188,716 | B2 | 11/2015 | Lochbihler |
| 2004/0239099 | A1 | 12/2004 | Tompkin et al. |
| 2007/0273142 | A1 | 11/2007 | Tompkin et al. |
| 2008/0094713 | A1 | 4/2008 | Tompkin et al. |
| 2010/0194091 | A1 | 8/2010 | Heim et al. |
| 2010/0277805 | A1 | 11/2010 | Schilling et al. |
| 2013/0250419 | A1* | 9/2013 | Lochbihler ............... B44F 1/02 359/546 |
| 2014/0353959 | A1* | 12/2014 | Lochbihler ............ B42D 25/29 283/85 |
| 2018/0002551 | A1* | 1/2018 | Grigorenko ............ B41M 3/148 |

FOREIGN PATENT DOCUMENTS

| | | | |
|---|---|---|---|
| DE | 102008046128 A1 | 3/2010 | |
| DE | 102010052665 A1 | 5/2012 | |
| DE | 102011115589 A1 | 4/2013 | |
| DE | 102011121588 A1 | 6/2013 | |
| EP | 1476317 A1 | 11/2004 | |
| EP | 1434695 B1 | 2/2005 | |
| EP | 1979768 A1 | 10/2008 | |
| EP | 1786632 B1 | 12/2009 | |
| WO | 9913157 A1 | 3/1999 | |
| WO | 02101669 A2 | 12/2002 | |
| WO | 2005095119 A1 | 10/2005 | |
| WO | 2005106601 A2 | 11/2005 | |
| WO | WO-2011064162 A2 * | 6/2011 | ............ B41M 3/148 |
| WO | 2012019226 A1 | 2/2012 | |
| WO | 2012069163 A1 | 5/2012 | |
| WO | 2013053435 A1 | 4/2013 | |
| WO | WO-2013091858 A1 * | 6/2013 | ............... G02B 5/08 |
| WO | 2014044402 A1 | 3/2014 | |

\* cited by examiner

SECURITY ELEMENT FOR PRODUCING VALUE DOCUMENTS

BACKGROUND

The invention relates to a security element for manufacturing value documents, such as bank notes, checks or the like, that has a substrate with an upper side and provides at least one image, wherein the image is formed by a grating structure which has a plurality of microcavities, and the microcavities respectively have in a spatial direction lying parallel to the upper side a structure width from 0.5 μm to 3 μm and perpendicular thereto a structure depth and have an aspect ratio which is defined by the ratio of structure depth to structure width, and a metal-containing coating applied to the grating structure.

The invention also relates to a value document with such a security element.

Further, the invention relates to a manufacturing method for a security element for value documents, such as bank notes, checks or the like, which provides at least one image, wherein for generating an image a grating structure having a plurality of microcavities side by side is formed on a substrate which has an upper side, the microcavities respectively are formed in a spatial direction lying parallel to the upper side, with a structure width of 0.5 μm to 3 μm and perpendicular thereto with a structure depth, and have an aspect ratio which is defined by the ratio of structure depth to structure width, and on the grating structure a metal-containing coating is applied.

Security elements serve to make it more difficult to copy or forge value documents such as bank notes, checks or the like. For such security elements, embossed structures have proved themselves which have, for example, microcavities in the form of a grating structure.

In the prior art security elements which have a microcavity structure are known. They provide microimages which are visible when enlarged with moiré magnification arrangements. The design of microimages for moiré magnification arrangements is discussed already in many respects in the prior art.

Also known are microcavity structures to effectuate an absorption of incident radiation and thereby, for example, supply a background for an image. The EP 1434695 B1 describes an absorbent structure with a period smaller than the light wavelength. The structure is constructed as a cross grating with sinusoidal profile. The WO 2005/106601 A2 relates to moiré magnification arrangements with microimages which consist of anti-reflective regions and partly reflective regions. The anti-reflective area is formed by nanostructures with a period smaller than 700 nm and a depth between 150 nm and 350 nm. In the EP 1979768 A1, multilayer bodies with microlens arrangement are explained in which microimages are generated by microholes or regions having different opacity. The WO 2002/101669 A2 describes microimages which are formed by fine points or perforations. The EP 1476317 A1 as well as the U.S. Pat. No. 7,468,842 B2 describe concave or convex surfaces, image elements as relief surfaces, which are filled with color, and "light trap patterns" formed through subwavelength structures, for producing microimages for moiré magnification arrangements.

From the DE 102008046128 A1 a matt structure is known for a security element which has a plurality of microelements with respectively a lateral dimension under 50 μm, wherein at least one geometry parameter of the microelements varies randomly to generate the matt effect. The geometry parameter can be the depth of the microelements.

The WO 2005/095119 A1 describes a security element in form of a multilayer foil body which shows a color alteration effect by means of interference dependent on angle of view. A relief structure, which is so configured with respect to its geometry that the color alteration effect is generated only in individual sections, is thereby molded in a replication lacquer layer. For this purpose the aspect ratio of the relief structure is varied.

The DE 102006050047 A1 describes a transmission view security element with microstructures, which are configured as microcavities which have a distance of 1 μm from each other.

Metallized security elements which have an elevated transmission in finely structured regions are known from the EP 1786632 B1. Therein a relief structure furnished with a metal layer is disclosed which is configured as a diffractive structure and contains regions of sinusoidal linear gratings or of cross gratings which have a period in the subwavelength region. To achieve the desired transmission effect, the structure elements have an aspect ratio of greater than 0.5. Such structures are also known from the DE 10 2004 042 136 A1. Manufacturing such structures, in particular also replicating and embossing subwavelength structures with high aspect ratio, is not quite unproblematic.

From the WO 2012/069163 A1, a reflective security element is known, which has a microcavity structure, which works as retroreflectors. A colored image is produced in plan view through suitable structuring.

Furthermore holograms are employed for security elements. Conventional holograms are relief structures vaporized with aluminum. The relief structures form a diffraction grating with different periods and orientations. A viewer perceives the hologram effect in the first diffraction order of the reflection. The grating profile of known embossed holograms has as a rule a sinusoidal cross section, as found in the U.S. Pat. No. 7,129,028, for example. Such embossed holograms appear uncolored in the reflection and are dark in transmitted light, i.e. have substantially no transmission.

As security elements are further known grating structures which show a color effect in the zeroth diffraction order in transmission. The WO 2012/019226 A1 describes so-called zero-order gratings which are formed by color filling or nanoparticles in an emboss structure. Upon transmissive viewing, color and polarization depend on the viewing angle.

The WO 2013/053435 A1 describes a rectangular grating with metallized plateaus which lie at different height levels and have a thin metal layer. Such structures have an angular-dependent color filtering upon transmitted light. However, they show no distinctly perceptible first diffraction order in the reflection, because the grating period lies in the sub-wavelength region.

SUMMARY

The invention is based on the problem of providing a security element which conveys different impressions in reflection and in transmitted light and thus increases the anti-forgery security for a value document.

This object is achieved according to the invention by a security element for manufacturing value documents, such as bank notes, checks or the like, which has a substrate having an upper side and supplies at least one image, wherein the image is formed by a grating structure which has a plurality of microcavities, and the microcavities respectively have in a spatial direction lying parallel to the upper side a structure width from 0.5 µm to 3 µm and perpendicular thereto a structure depth and have an aspect ratio which is defined by the ratio of structure depth to structure width, a metal-containing coating is applied to the grating structure, wherein the microcavities are trough-shaped, the aspect ratio of the microcavities is 0.3 or greater, preferably greater than 0.4, particularly preferably greater than 0.8 and very particularly preferably greater than 1.0, and in the grating structure the microcavities are separated from each other by strips which are planar and respectively more than 200 nm and maximally 1,200 nm wide.

The object is further achieved by a manufacturing method for a security element for value documents, such as bank notes, checks or the like, which provides at least one image, wherein on a substrate, which has an upper side, for producing an image, a grating structure is formed which has a plurality of microcavities lying side by side, the microcavities are respectively configured in a spatial direction lying parallel to the upper side with a structure width from 0.5 µm to 3 µm and perpendicular thereto with a structure depth and an aspect ratio which is defined by the ratio of structure depth to structure width, a metal-containing coating is applied to the grating structure, wherein the microcavities are trough-shaped, the aspect ratio of the microcavities is 0.3 or greater, preferably greater than 0.4, particularly preferably greater than 0.8 and very particularly preferably greater than 1.0, and in the grating structure the microcavities are separated from each other by strips which are planar and respectively more than 200 nm and maximally 1,200 nm wide.

The object is finally also achieved with a value document having such a security element of the stated kind.

The invention employs a metallized grating with trough-shaped profile, wherein strips respectively lie between the trough-shaped microcavities which are planar and have a width of more than 200 nm and maximally 1,200 nm. Thereby one attains an angular-dependent color effect in transmission as well as a hologram structure in reflection by the arrangement of the reflexive acting strips. The term "planar" for the strips thereby describes that the angle of inclination to the surface, i.e. generally of the horizontals, is no greater than 30°. The planar strips can also have a certain roughness, as long as an average aspect ratio of 0.2 is not exceeded. The microcavities in contrast have two sections steeper than 70° because of their trough form.

The security element according to the invention combines the transmission view effects, which are generated by the trough-shaped microcavities, with the plan-view effects which are generated by the planar strips between the trough-shaped microcavities.

The geometrical arrangement of the grating structure's strips visible in reflection, i.e. in plan view, structures the reflective image, for example as a hologram. The geometrical configuration and arrangement of the trough-shaped microcavities structure the transmission view image.

The coating on the grating structure is metallic so that the strips appear reflexive. If one configures them in such a way that the coating is applied in identical nominal thickness to the trough-shaped microcavities as to the strips, one obtains a particularly good color effect in transmission in combination with a good reflection and thus a good hologram effect in plan view. The coating in the region of the microcavities is thus nominally equally thick as on the strips. The term "nominal thickness" is understood as the thickness measured perpendicularly to the surface, wherein the plane of the surface is defined by the planar strips. Such an equal nominal thickness can be attained, for example, by a vapor deposition method or a sputtering method. Other directional coating methods or suitable coating methods also come into consideration. With such a coating applied in the same nominal thickness, the local layer thickness, measured normally to the local surface tangent, as a rule differs between the microcavities and strips. This effectuates an particularly good color effect in transmission through the trough-shaped microcavities.

For the structuring of the image in transmissive viewing the grating structure is decisive, e.g. kind, geometry and alignment of the trough-shaped microcavities. It is therefore preferred in one embodiment to provide at least two kinds of microcavities which differ with respect to their aspect ratio. In a development it is provided that the aspect ratio of the microcavities in the grating structure varies in some regions according to a predetermined pattern, by which the transmission view image is defined.

In this context the term "in some regions" is to be understood to mean that there are regions in security element having a different embodiment of the grating structure, e.g. as to the aspect ratio.

In a further embodiment the microcavities and strips are periodic transversely to the trough direction. For example, a microcavity forms a period with the strip located thereside. In this embodiment it is preferred to vary the period in some regions according to a predetermined pattern defining an image. Through this variation e.g. the generated hologram is generated as a reflection image.

A mentioned hereinabove, the aspect ratio of the microcavities affects the transmission behavior of the security element. In one embodiment it is therefore preferred to structure the first image region of the image, in particular the foreground, by two different kinds of microcavities which differ in respect to the aspect ratio. Deeper microcavities have a higher lightness in transmissive viewing than shallower microcavities and, as a rule, also a different color behavior as will be explained.

One can attain a continuous intensity variation in transmitted light if the aspect ratio of the microcavities in the grating structure varies according to a predetermined pattern defining the first image region in particular the foreground of the image.

It is provided in one embodiment that the metal-containing coating is an interference-layer construction having the layer sequence metal-dielectric-metal. Then resonance effects can be utilized which play a part in certain aspect ratios, in particular in combination with certain aperture widths. Onto these a color effect can be generated which can depend, for example, on the viewing angle. Microcavities overlaid with an interference-layer construction show in particular a strong intensity contrast or color contrast. $SiO_2$ is a possible element as a dielectric, and aluminum or chromium as a metal.

One obtains a particularly good lightness difference in transmitted light with an interference-layer construction which is symmetric concerning its material sequence and/or layer thickness sequence. Particularly a layer sequence aluminum-SiO$_2$-aluminum is preferred, wherein the layer thickness of the aluminum lies between 7 nm and 25 nm, preferably between 10 nm and 15 nm, and that of the SiO$_2$ between 70 nm and 250 nm.

According to a further preferred embodiment the metal-containing coating can be formed by a pure metal layer. Such an embodiment has the advantage that the strips appear opaquely. In this connection the term "metal" also includes metal alloys. Metal layers may be, for example, layers of aluminum, copper, chromium, silver, gold or an alloy thereof, wherein the layer thickness of the metal layer lies preferably between 10 nm and 100 nm.

The aspect ratio is the ratio of maximum depth to minimum lateral extension and varies according to the desired image structure in the security element. Elaborate printing methods for providing smaller and nevertheless finely structured images are therefore no longer necessary. Instead, simple replication processes for producing the grating structure can be employed.

From a manufacturing perspective it is advantageous that in the security element the surface coating on the grating structure does not change laterally at least in the nominal thickness.

For the manufacturing method according to the invention, direct exposure technologies in particular come into consideration, e.g. with the help of a laser writer. Manufacture can be effected analogously to known manufacturing methods for microlenses. The original of the grating structure is written via direct exposure using a laser writer into a substrate coated with photoresist, and subsequently the exposed portion of the photoresist removed. An exposed original can subsequently be galvanically molded and thus an embossing stamp produced. Finally, the structure is replicated via an embossing process, for example in UV lacquer on foil or directly (e.g. by hot-stamping the surface of the foil). Alternatively, a nanoimprinting process can be used. More elaborate methods for manufacturing originals, such as electron-beam or "focused-ion-beam" exposure methods, allow an even finer configuration of the grating structure's geometry. These manufacturing methods offer many design options in the choice of the geometry of the microcavities.

Thereupon a coating of the surface is effected, e.g. with a metal layer and/or an interference-layer construction. For this purpose come into consideration electron-beam vapor deposition, sputtering or by thermal evaporation in a vacuum, among other things. For the protection, the structure is finally laminated preferably with to a cover layer.

With constant aperture width, microcavities having different aspect ratios can also be generated solely by a variation of the depth of the microcavities, for example by a corresponding variation of the exposure intensity of a laser writer. Such a procedure offers the advantage of a substantially simpler data preparation.

According to a further preferred embodiment, a motif which is formed by an arrangement of microcavities can additionally be equipped with recesses in form of characters, patterns or the like, the so-called "Cleartext". This "Cleartext" possesses a high transparency in transmission and hence stands out in the contrast to the motif which is formed by microcavities. Moreover, the "Cleartext" appears color-neutrally. This results in additional variants to realize customized designs. Additionally the anti-forgery security of such an embodiment increases.

A preferred manufacturing variant for "Cleartext" is to print washing ink on the emboss structure as it is known, for example, from WO 99/13157 A1. Thereupon the embossed foil is metallized. Finally the washing ink with the metal layer located above is removed in a subsequent working operation. It is also possible to generate the Cleartext by laser demetallization on the metal-vapor-coated embossing foil, wherein a laser beam partly removes the metal layer. The Cleartext can further also be generated by the so-called metal transfer method as it is known, for example, from WO 2014/044402 A1. For this purpose the Cleartext regions must be arranged in a raised way so that the metal layer of these regions can be removed by the contact with a transfer foil.

The security element can be configured in particular as a security thread, pull strip, security band, security strip, patch, foil element or as a label. In particular the security element can span transparent regions or recesses and/or be employed for a safety card or an identity document (e.g. passport).

The security element in particular can be a part of a precursor to a value document not yet fit for circulation, which can also have, for example, further authentication features (such as luminescent substances provided in the volume) besides the security element according to the invention. Value documents are understood here to be, on the one hand, documents having the security element. On the other hand, value documents can also be other documents and objects that can be furnished with the security element according to the invention, in order for the value documents to have uncopiable authentication features, thereby making it possible to check the authenticity and at the same time preventing unwanted copies. Chip cards or safety cards, such as bank cards or credit cards, are further examples of a value document.

The manufacturing method according to the invention can be configured such that the described preferred configurations and embodiments of the security element are manufactured.

It will be appreciated that the features mentioned hereinabove and those to be explained hereinafter are usable not only in the stated combinations but also in other combinations or in isolation without going beyond the scope of the present invention.

BRIEF DESCRIPTION OF THE DRAWINGS

Hereinafter the invention will be explained more closely by way of example with reference to the attached drawings, which also disclose features essential to the invention. For clarity's sake, the representation in the figures is not true to scale or to proportion. There are shown.

DETAILED DESCRIPTION OF VARIOUS EMBODIMENTS

In the figures, the subsequent embodiments for a security element 1 are described which supplies a view-through image in transmission and a reflective image in plan view. The images are generated by a grating structure 4.

In one embodiment the security element 1 is constructed on a transparent foil 2 on which an emboss-lacquer layer 3 is located. In the emboss-lacquer layer 3 a grating structure 4 is molded which has trough-shaped microcavities 5, 6 e.g. of different depths. Between the microcavities 5, 6 planar strips 7 are located. The microcavities 5, 6 and the strips 7 have, as will be explained, a breadth or width, which does not allow them to be resolve with the unarmed eye.

Figure 1:
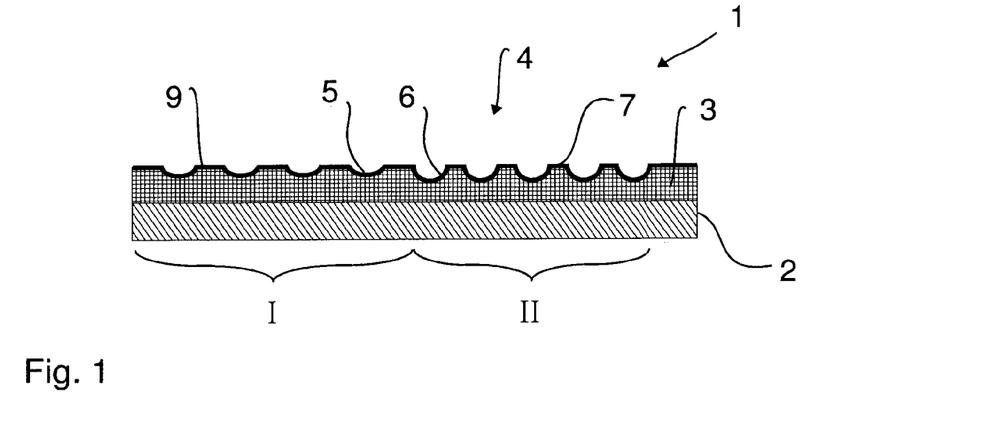
FIG. 1 a schematic representation of a part of a security element with a grating structure, FIG. 2 a schematic representation to illustrate the geometry of microcavities of the grating structure, FIGS. 3 and 4 schematic representations of different geometries which are possible for the grating structure of FIG. 1, FIG. 5 the transmission of a security element as a function of the wavelength for different angles of incidence and coating thicknesses, FIG. 6 the transmission properties of a security element as a CIE 1931 color diagram of the grating structures of FIG. 5, FIG. 7 LCh values as a function of the angle of incidence for the grating structures of FIG. 5, FIG. 8 a representation similar to FIG. 6, however, now for grating structures having a different period, FIG. 9 a representation similar to FIG. 7 for the grating structures of FIG. 8, FIGS. 10 to 12 plan views of motifs with different lateral variation of the grating structure, and FIGS. 13 to 15 schematic representations to explain the effect of the security element in transmission view and in plan view.

FIG. 1 shows that the security element has in one embodiment two regions I and II in which the geometry of the grating structure 4 differs. In the embodiment example of FIG. 1 the difference lies, firstly in the period with which the microcavities 5, 6 and the strips 7 are arranged, as well as in the aspect ratio of the microcavities 5, 6. As will be explained in the following, this is only one of several possibilities for a different geometry of the grating structure 4.

Figure 2:
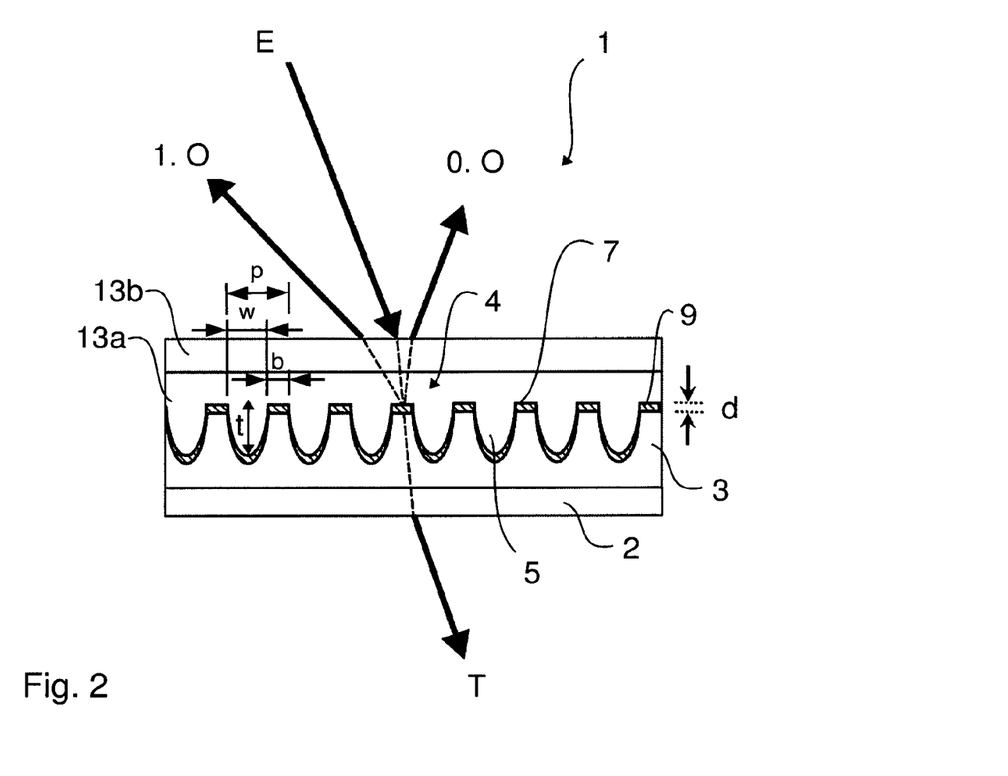

FIG. 2 shows by way of example a region of the security element 1 in which the geometry of the grating structure 4 is homogeneous. The grating element 4 is coated with a layer 9, which consists of aluminum for example. FIG. 2 shows schematically for illustration purposes some microcavities 5 in cross section. They have a structure width w and a structure depth t. In embodiment examples the structure width w of the microcavities 5 amounts to between 0.5 and 3 μm. The structure depth t is chosen so that an aspect ratio t/w is for each of the microcavities of the grating structure 4 is greater than 0.3, preferably greater than 0.4, particularly preferably greater than 0.8 and very particularly preferably greater than 1.0. The microcavities are so large that a light diffraction does not dominate (anymore), then again, so small with respect to their structure width w and the structure depth t that ray-optical effects do not dominate (yet).

Between neighboring microcavities 5 one strip 7 is located respectively which has the width b. Microcavities 5 with neighboring strip 7 recur so that through w+b the period p of the periodic grating structure 4 is defined. The width b of the strips 7 is greater than 200 nm and does not exceed 1.2 μm. The period p lies between 300 nm and 5,000 nm.

The layer 9 is applied in a thickness d which is chosen so large that the transmission through the security element 1 is substantially effected in the microcavities. The thickness d of the layer 9 on the grating structure 4 is nominally the same, which can be attained, for example, by a directed vapor deposition with the metal which forms the layer 9. Therefore the metal layer in the slanted or perpendicularly running sections of the trough-shaped microcavities perpendicular to the local surface inclination is thinner than in horizontally running area elements.

The geometry of the microcavities affects the transmission behavior of the security element 1. Incident radiation E is reflected partly directly. This is designated in FIG. 2 as "0. O", which represents the zeroth order of the reflection (according to the conventional specular reflection). Because the period p lies in the region of the light's wavelength, the periodic sequence of microcavities 5 and strips 7 also acts diffractively so that there is also a first order of the reflection. It is symbolizes with "1. O" in the drawing. The rays drawn in FIG. 2 are, of course, only an example at one point of the security element 1. In fact the radiation E impinges areally onto the security element 1.

To obtain a security element 1 which is flat at both cover surfaces, the grating structure 1 is covered with a covering lacquer layer 13a as well as a protective layer 13b on its upper side. In this manner the e.g. metallic structure of the layer 9 is embedded into a dielectric. The protective layer 13b can, for example, be realized as a laminated cover foil.

The transmission properties as well as the reflecting properties of the security element 1 can be adjusted in some regions by varying the geometry of the grating structure 4 in regions, for example the regions I and II of FIG. 1. In a first embodiment the aspect ratio of the microcavities is varied. In a second embodiment the period p of the grating structure 4 is varied. Further, for a constant period the structure width w and the width b can be varied. This represents a further embodiment. The features of these embodiments can also be combined. Thus, for example, FIG. 1 shows an embodiment for which the aspect ratios of the microcavities (here through two types of microcavities 5, 6) as well as the period p differ in the regions I and II. In region I and II the structure width w of the microcavities 5, 6 is identical, the structure depths t differ however. The period p is different in the regions I and II of FIG. 1 by the fact that the width b is varied. It is larger in the area I than in the area II.

Figure 3:
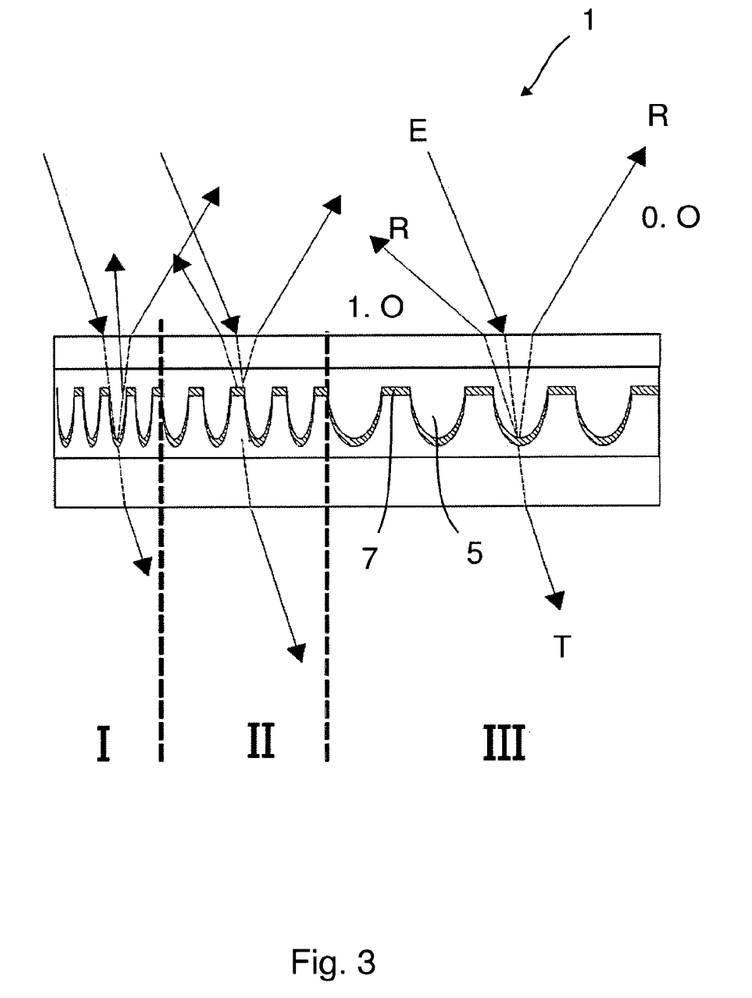

FIG. 3 shows an embodiment in which the three regions I, II and III are present, which differ concerning their period p. In this connection the ratio of structure width w to the width b is constant in the regions I, II, III. Also the structure depth t is identical in all regions. The aspect ratio decreases from the region I up to the region III, the period increases. This different geometry of the grating structure 4 in the regions I to III influences the transmittance T and the spectral properties of the transmission. Moreover, the different period affects the angle of emergence of the respective diffraction orders according to the following equation sin θn+ sin θn=n·λ$_0$/p, wherein are θ$_0$ the angle of incidence, θ$_n$ the angle of emergence, "n" the n-th diffraction order, λ$_0$ the wavelength of the incident light and p the grating period. In this connection is to be taken into consideration that the wavelength depends on the refractive index of the surrounding medium. For UV-curing lacquers and plastics as well as laminate foils this lies at about 1.5. Possible materials for the layer 9 are highly reflective materials such as aluminum, silver, gold, copper or chromium or alloys thereof, for all embodiments of the security element 1.

The desired transmission occurs if the aspect ratio is greater than 0.3.

Figure 4:
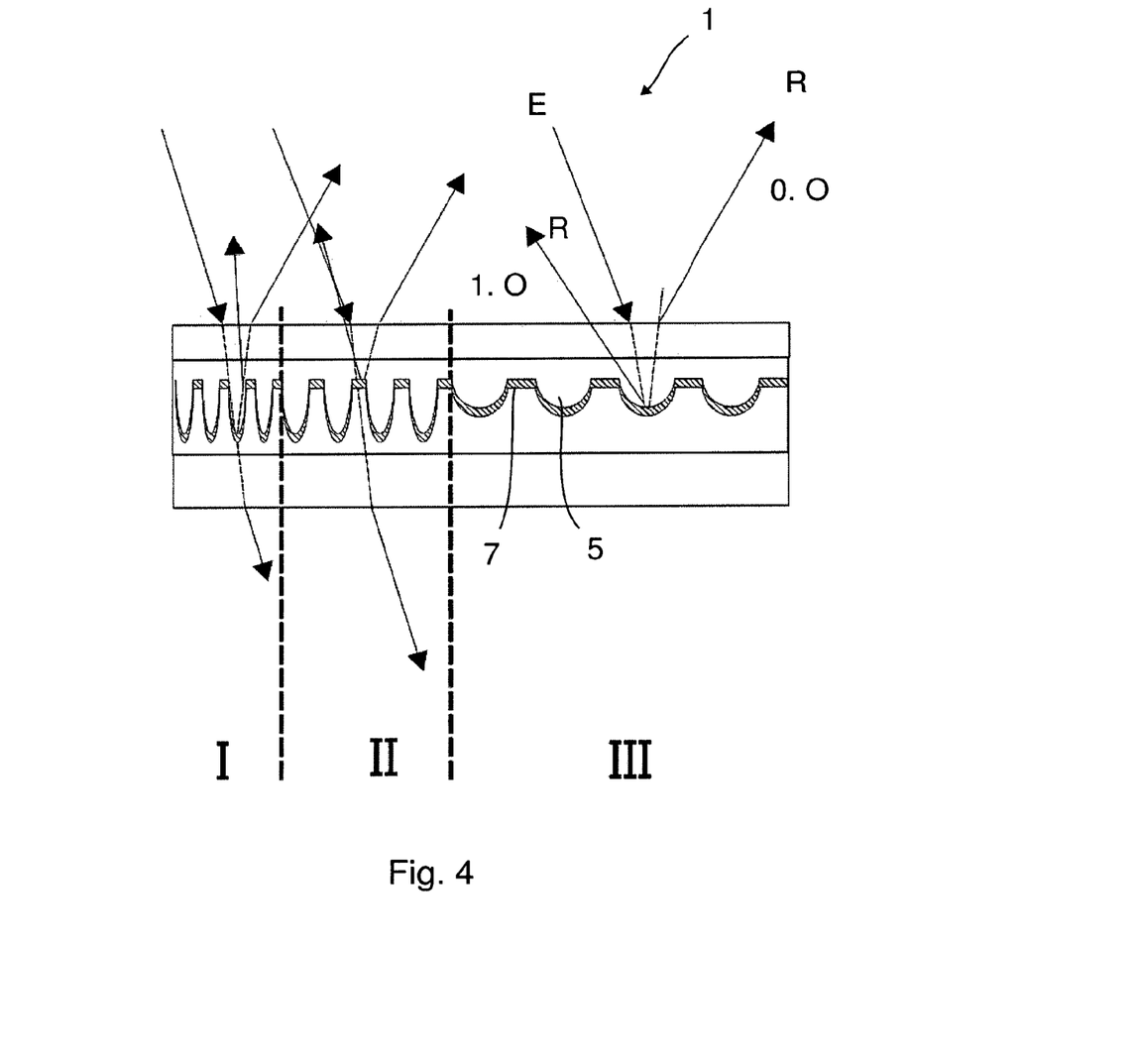

FIG. 4 shows a further embodiment for which the aspect ratio of the grating structure's microcavities is additionally changed by varying the structure depth tin the region III.

Figure 5:
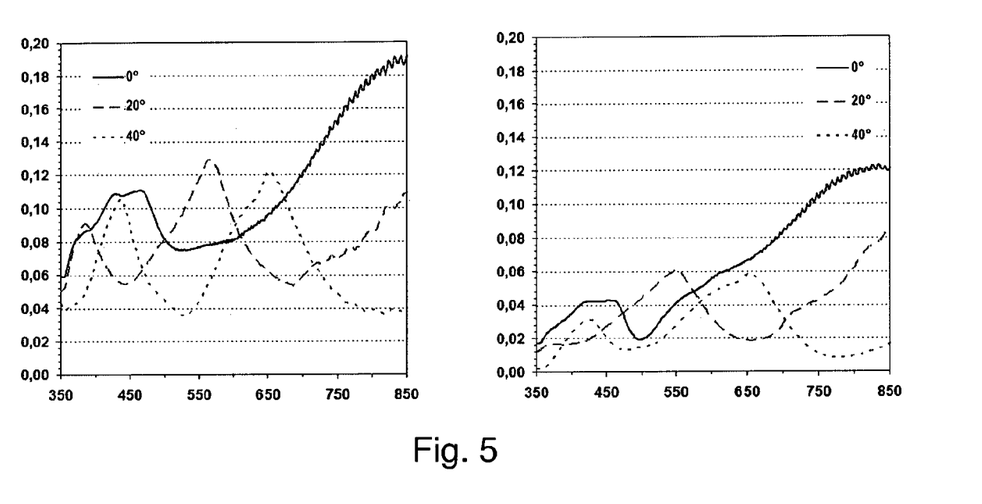

Hereinafter the spectral transmission for a grating with p=600 nm and the above-mentioned properties is examined. The layer 9 consists of aluminum having d=40 nm (left representation of FIG. 5) or d=80 nm (right representation of FIG. 5). The grating structure 4 is completely embedded into a UV-curing lacquer with a refractive index of 1.52. FIG. 5 shows the measured transmission of the security elements 1 as a function of the wavelength (applied in nm) for different angles of incidence $\theta_0$. The incident light is unpolarized.

In FIG. 5 are recognizable the perpendicular light incidence with 0° peaks having about 450 nm and an increase in intensity in the long-wave region above 600 nm. For oblique angles of incidence there are two peaks which travel to the long-wave region with increasing angle of incidence. These peaks are responsible for a color filtering of the security element in transmitted light, i.e. in transmission, because radiation is transmitted with more long-wave radiation with increasing angles of incidence. The described security element therefore shows a color-shifting tilt effect. These color properties are shown in more detail in FIG. 6, which shows a CIE 1931 color diagram.

Figure 6:
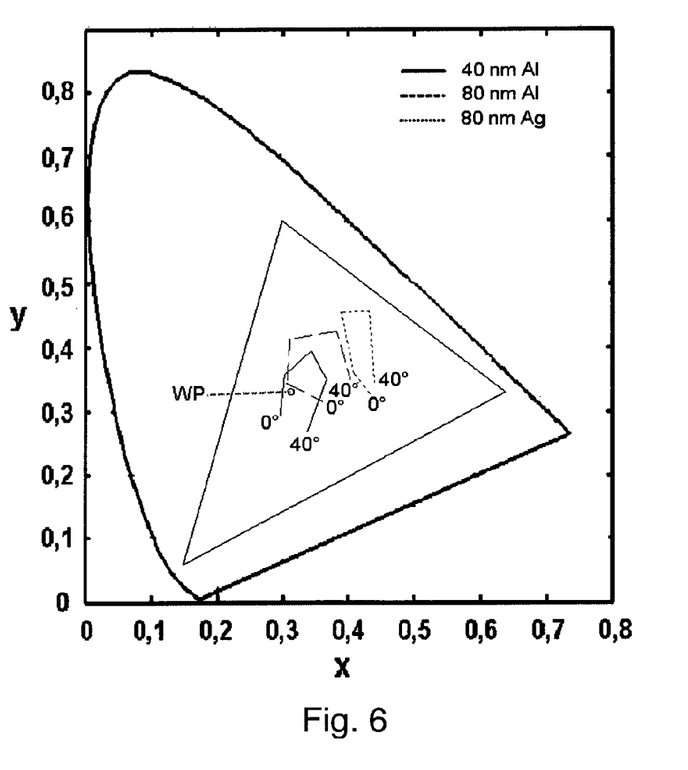

A color value results from the convolution of the spectral transmission with the sensitivity curve of the human eye, which is known to be the greatest in the green region, and the spectral emission of an illumination, which for the purpose of the analysis is assumed as standard illumination D65. The thus obtained color values of three different gratings, which differ with respect to the thickness and the material of the layer 9 as is entered in FIG. 6, are represented as trajectories for an angle range $\theta_0$ of 0° to 40°. The white point is marked in FIG. 6 with WP.

Figure 7:
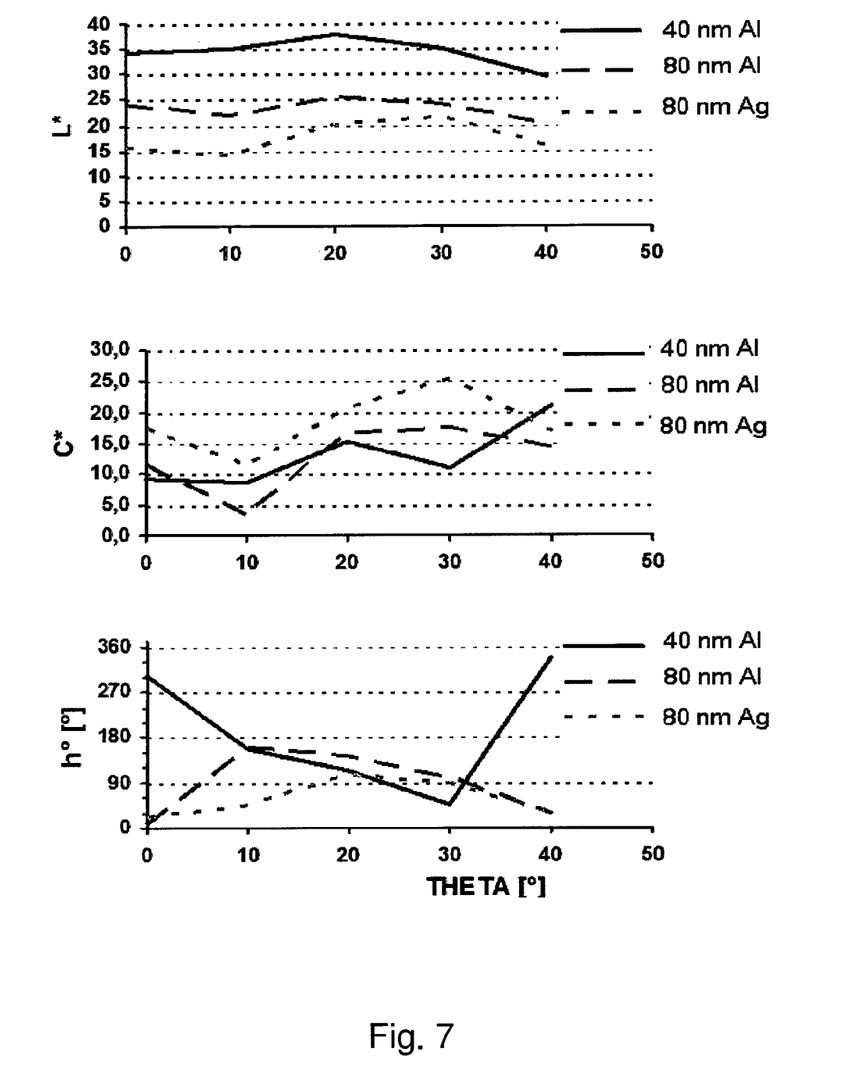

The appurtenant color values in the LCh color space are shown in FIG. 7. The color tone C* and the chroma h* as well as the color lightness L* are shown.

The grating underlying the measurement values of FIGS. 5 to 7, which has p=600 nm, t=321 nm, b= to 305 nm and an aspect ratio of 1.09, varies its color from blue to red upon tilting. This holds for a layer thickness d=40 nm as well as a layer thickness d=80 nm. In contrast, the similar but silver-vaporized grating having a layer thickness d=80 nm shows a smaller color variation. However, its colors are more saturated, as FIG. 6 shows. These properties are also apparent in the L* plot of FIG. 7, according to which the lightness is moreover greater for the thinner aluminum layer than for the thicker one.

Figure 8:
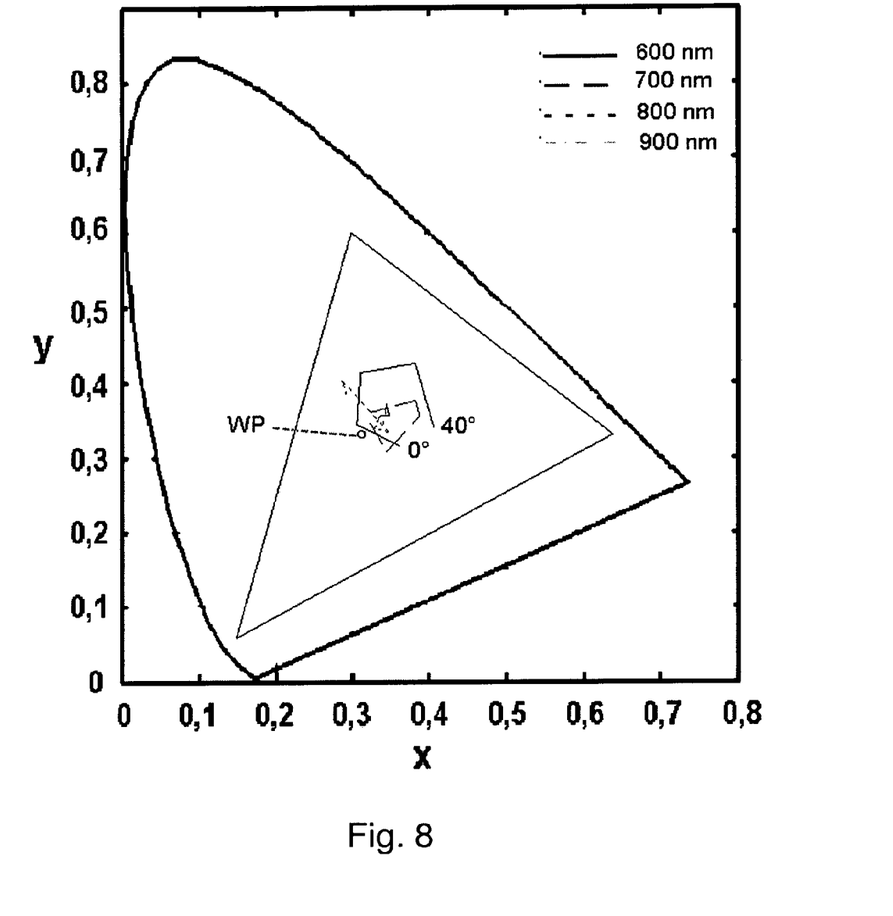
Figure 9:
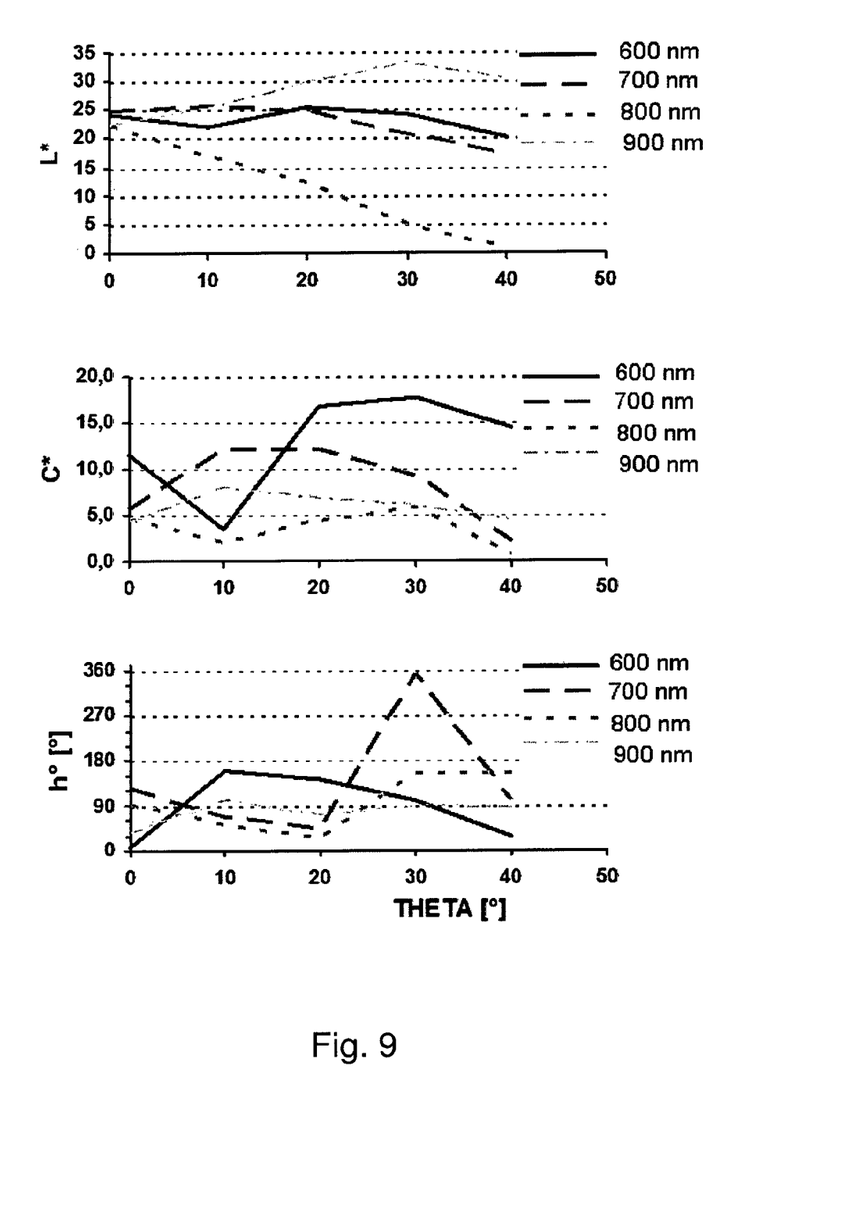

The FIGS. 8 and 9 show plots corresponding to FIGS. 6 and 7, however, now for a grating with an aluminum layer 9 with d=80 nm. The period p is varied in FIGS. 8 and 9. It is to note that the color variation decreases for increasing grating periods. The lightness upon tilting can decrease or increase depending on the grating period.

Figure 10:
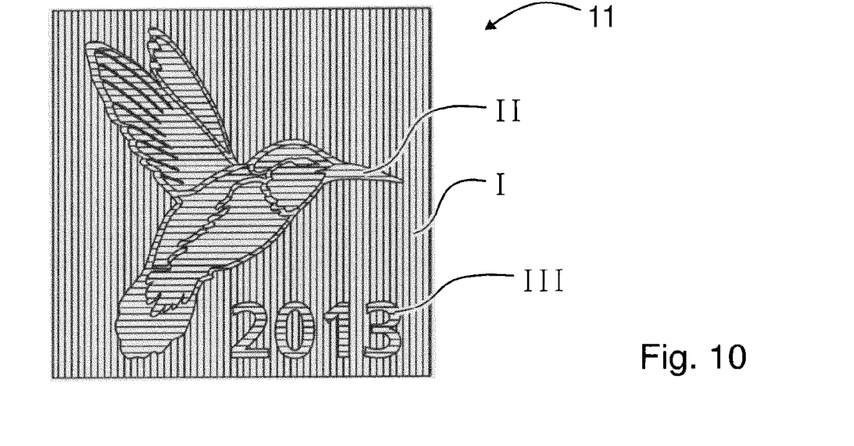
Figure 11:
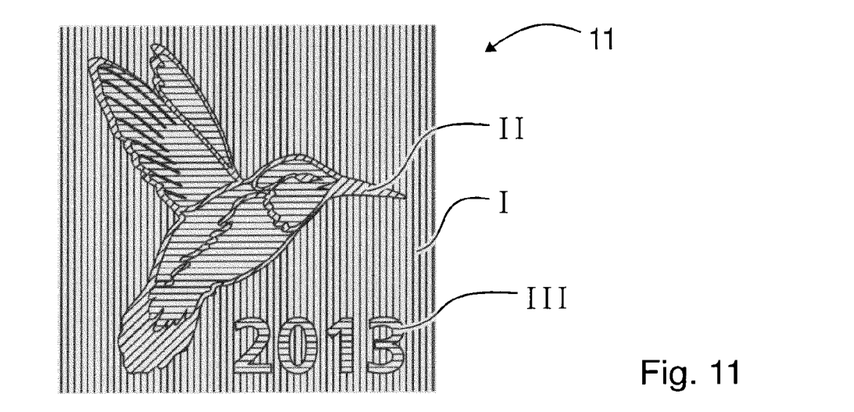
Figure 12:
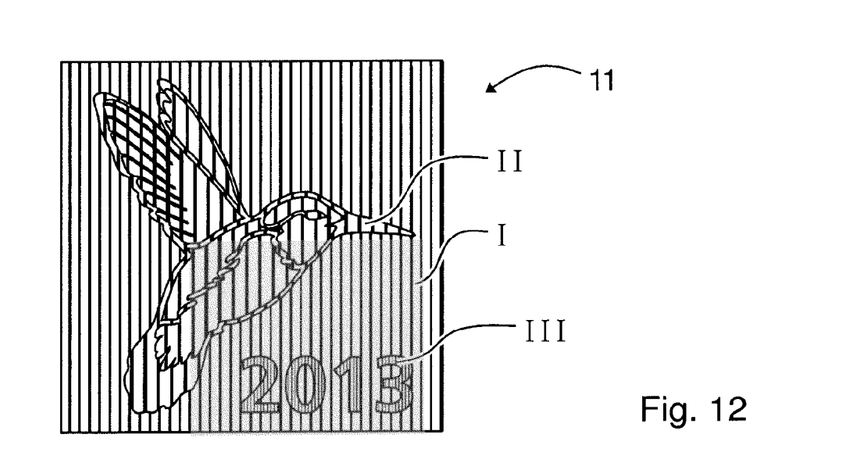

The choice of the grating structure 4 allows generating an image 11 which presents itself as a view-through image differently than as a reflective image. FIGS. 10 to 12 show three exemplary variants. In the embodiment of FIG. 10 a grating structure 4 is employed whose trough direction of the microcavities runs either vertically (region I) or horizontally (region II and III). Regions of the identical trough direction can be designed differently through the aspect ratio or the period of the grating structure.

FIG. 11 shows an image 11, for which three different orientations of the trough directions are employed in the regions I, II and III.

Finally, FIG. 12 shows an embodiment in which the trough directions are identical in all regions I to III, the periods in three regions, however, differ.

When viewed perpendicularly, no motif is to be seen in transmission view. The motive appears upon tilting. Moreover, a color exchange occurs upon rotation. These complementary colors are also evident upon tilting east/west or north/south. The reason for this is that the spectral transmission is hardly influenced when the grating is tilted perpendicularly to the plane of incidence.

Figure 13:
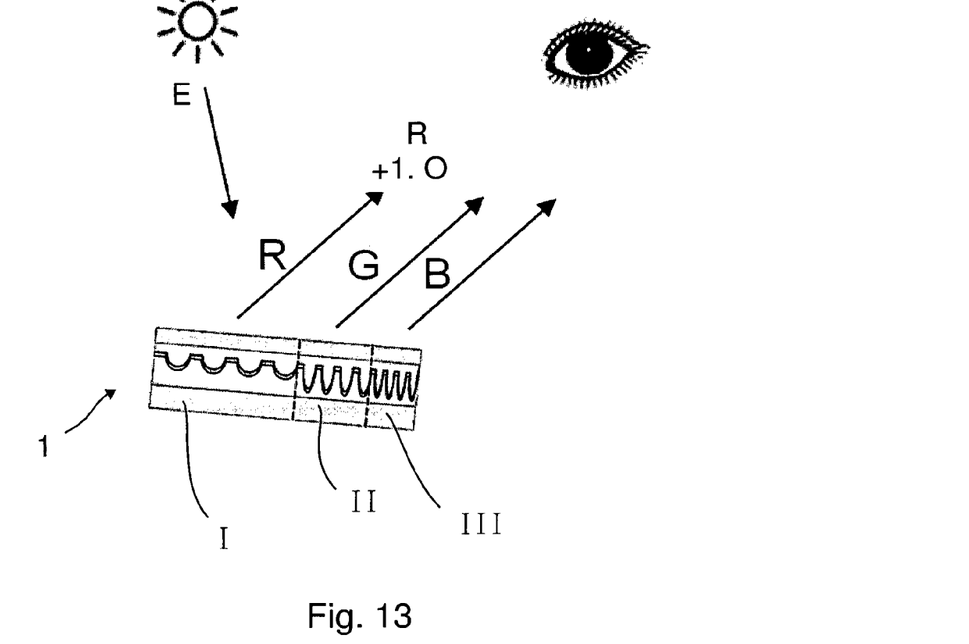

Conventional embossed holograms appear colored in the first diffraction order in reflection. In contrast, the structures are opaque in transmission. In all embodiments the security element 1 shows besides the image in reflection also an image (normally identical in terms of the motif) in transmission. FIG. 13 illustrates the occurrence of the first diffraction order (+1. O) of the security element 1 in reflection R. As can be recognized, there result for the three regions I to III, which have different periods and aspect ratios for the grating structure 4, different color impressions, e.g. mixture of the primary colors R, G, B. In this respect, the security element in its presented image corresponds to a conventional hologram.

Figure 14:
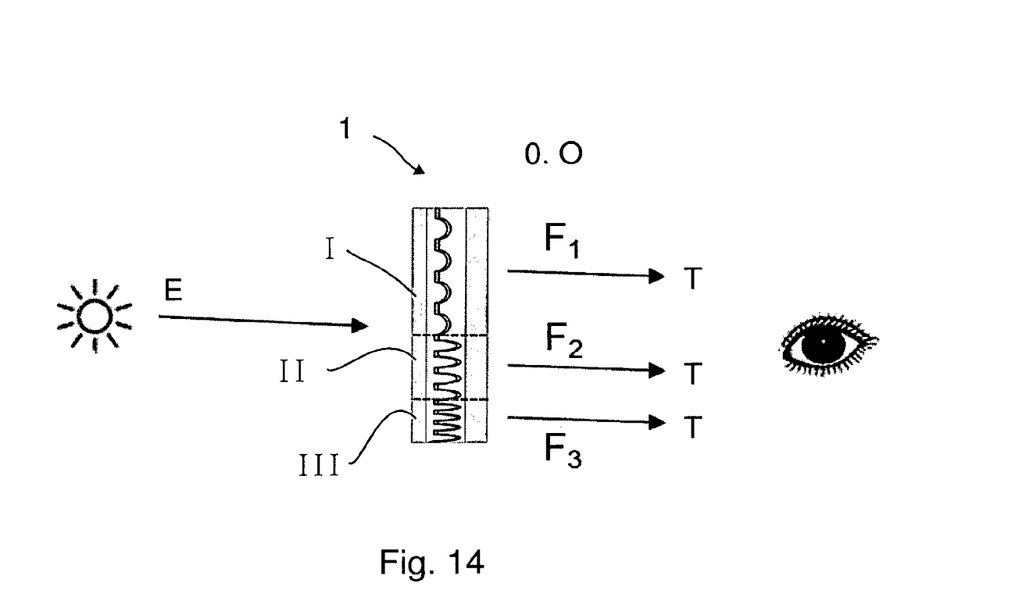

The security element 1, however, is also partly transparent. The zeroth order (0. O) appears, as FIG. 14 shows, in color in transmission T, wherein the color impressions $F_1$, $F_2$ and $F_3$ differ for the three regions I, II and III. Hence a viewer perceives the motif of the image 11 in transmission view colored if it is penetrated by radiation of white light, e.g. daylight, as an incident light E.

Figure 15:
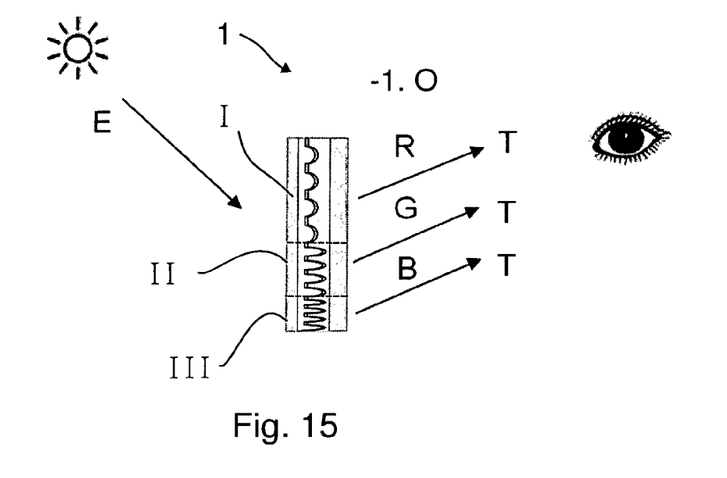

Additionally the first diffraction order can also be observed in transmission. FIG. 15 shows by way of example the −1st diffraction order (−1. O). If incident light E strikes the security element 1 from above, it is diffracted in the direction of a viewer located on the opposing side, wherein the colored impression of the hologram is perceived as in the reflection R. This is particularly impressive if the direct optical path, as seen from the eye of the viewer, is pointing to a dark area and the security element 1 lights up brightly colored at the corresponding tilting angle and the color impression in turn differs for three regions I, II and III.

A further embodiment can be achieved by further grating orientations. Therefore, motion effects or running effects can also be implemented. The most favorable variant is the motif design through regions which are filled with gratings of different periods (see FIG. 12). In addition, the gratings in the individual regions can be oriented differently so that besides a high-contrast appearance in transmission, the hologram appears distinctly in reflection. Smooth regions or regions with non-transmissive gratings can additionally be contained. These regions would appear opaquely in transmission view. For a motif design, this can serve for delimiting the contrast between different regions.

The security element can be combined with other known structures, such as subwavelength gratings, micromirrors, matt structures etc., to achieve an even higher anti-forgery security. Further, regions can be demetallized and thus be fully transparent. Such combined structures can increase the variety of design.

The manufacture of the grating structure 4 is preferably effected, as explained in general part of the description, by direct laser exposure in a photolithographic process. Microcavities 5, 6 with dimensions up to a minimum diameter of 0.5 μm can be written with the help of a laser writer directly to photoresist. Due to the non-linear sensitivity of common photoresist, structures can be generated by choosing the suitable exposure intensity which are distinctly finer than the beam diameter of the laser. The structure depth can be very simply varied by the choice of the exposure intensity.

For the manufacture of microcavities with high precision, optionally electron beam or "Focused Ion Beam" exposure methods can also come into consideration. An exposed original can be galvanically molded once the photoresist has developed and be replicated by an embossing process in UV lacquer onto foil or directly in the surface of the foil. Alternatively, nanoimprinting processes can also be used.

In a last step the coating of the surface is effected, e.g. through undirected vapor deposition. Metallized surfaces or interference-layer systems can be applied by electron-beam vapor deposition, sputtering or by evaporation in a vacuum. For protection, preferably the coated side will subsequently be furnished with the covering lacquer layer 13.

The images can also record hidden information on a value document, e.g. microprint, serial numbers, symbols etc. which cannot be detected by an unarmed eye. Advantageously, the microimages have substantially smaller structures than known laser engravings. The employment of the microcavity structure 4 allows a very fine structuring of images or motifs with high lateral resolution which is not possible with conventional printing methods.

The strips 7 are referenced in the drawings as completely smooth. This is not compulsory. They can have a remainder roughness, wherein an aspect ratio of 0.2 or an angle of 30° to the horizontal is not exceeded.

The alignment of the microcavity structure is irrelevant for the transmitted light effect. An inversion of the security element compared with the representation of FIG. 1 or 2 is thus possible any time.

LIST OF REFERENCE SIGNS 1 security element
2 foil
3 embossing lacquer layer
4 grating structure
5, 6 microcavities
7 strip
9 layer
13a covering lacquer layer
13b protective layer
w structure width
t structure depth
b width
d thickness
p period
WP white point
I, II, III region
E incident radiation
R reflected radiation
T transmitted radiation
0. O) zeroth order
1. O first order
$F_1$, $F_2$, $F_3$ color impression

The invention claimed is:

1. A security element for manufacturing value documents, which has a substrate having an upper side and provides at least one image, wherein
the image is formed by a grating structure, which has a plurality of microcavities, and
the microcavities respectively have in a spatial direction lying parallel to the upper side a structure width from 0.5 µm to 3 µm and perpendicular thereto a structure depth and have an aspect ratio which is defined by a ratio of structure depth to structure width,
a metal-containing coating is applied to the grating structure,
wherein
the microcavities comprise grooves,
the aspect ratio of the microcavities is 0.3 or larger, and
in the grating structure the microcavities are separated from each other by strips which are planar and respectively more than 200 nm and maximally 1,200 nm wide, producing an angular-dependent color effect in transmission as well as a hologram structure in reflection.

2. The security element according to claim 1, wherein the coating has the same nominal thickness on the strips as in the area of the microcavities.

3. The security element according to claim 1, wherein the grating structure has at least two kinds of microcavities which differ with respect to the aspect ratio.

4. The security element according to claim 1, wherein the aspect ratio of the microcavities in the grating structure varies in some regions according to a predetermined pattern defining a view-through image.

5. The security element according to claim 1, wherein the microcavities and strips are periodically arranged transversely to a groove direction, wherein the period varies in some regions according to a predetermined pattern defining a view-through image.

6. The security element according to claim 5, wherein the groove directions and the periods vary laterally in such a way that in transmission a motif is visible as a view-through image and in reflection a hologram as a reflection image.

7. The security element according to claim 1, wherein a groove direction of the microcavities in the grating structure varies in some regions according to a predetermined pattern defining a view-through image.

8. The security element according to claim 7, wherein the groove directions and the periods vary laterally in such a way that in transmission a motif is visible as a view-through image and in reflection a hologram as a reflection image.

9. The security element according to claim 1, wherein the coating is Al, Ag, Au, Cu or Cr or comprises an alloy thereof.

10. A value document having a security element according to claim 1.

11. A manufacturing method for a security element for value documents, which provides at least one image, wherein
for producing an image a grating structure having a plurality of microcavities lying side by side is formed on a substrate having an upper side,
the microcavities are respectively formed in a spatial direction lying parallel to the upper side with a structure width from 0.5 µm to 3 µm and perpendicular thereto with a structure depth and have an aspect ratio which is defined by a ratio of structure depth to structure width, and
a metal-containing coating is applied to the grating structure
wherein
the microcavities comprise grooves,
the aspect ratio of the microcavities is 0.3 or larger, and
in the grating structure the microcavities are respectively separated from each other by strips which are planar and respectively more than 200 nm and maximally 1,200 nm wide, producing an angular-dependent color effect in transmission as well as a hologram structure in reflection.

12. The manufacturing method according to claim 11, wherein the coating is applied on the strips with the same nominal thickness as in the area of the microcavities.

13. The manufacturing method according to claim 11, wherein the grating structure has at least two kinds of microcavities which differ in respect to the aspect ratio.

14. The manufacturing method according to claim 11, wherein the grating structure is formed with at least two kinds of microcavities which differ in respect to the aspect ratio, wherein a view-through images is structured by the at least two different kinds of microcavities.

15. The manufacturing method according to claim 11, wherein the aspect ratio of the microcavities in the grating structure is varied in some regions according to a predetermined pattern defining a view-through image.

16. The manufacturing method according to claim 11, wherein the microcavities and strips are periodically arranged transversely to a groove direction, wherein the period is varied in some regions according to a predetermined pattern defining a reflection image.

17. The manufacturing method according to claim 16, wherein the groove directions and the periods are varied laterally, that in transmission a motif is visible as a view-through image and in reflection a hologram as a reflection image.

18. The manufacturing method according to claim 11, wherein a groove direction of the microcavities in the grating structure is varied in some regions according to a predetermined pattern defining a view-through image.

19. The manufacturing method according to claim 18, wherein the groove directions and the periods are varied laterally, that in transmission a motif is visible as a view-through image and in reflection a hologram as a reflection image.

20. The manufacturing method according to claim 11, wherein Al, Ag, Au, Cu or Cr or an alloy thereof is used for the coating.

* * * * *